(12) United States Patent
Abecassis et al.

(10) Patent No.: US 7,044,854 B2
(45) Date of Patent: May 16, 2006

(54) AREA-BASED RESOURCE COLLECTION IN A REAL-TIME STRATEGY GAME

(76) Inventors: David H. Abecassis, 18457 Long Lake Dr., Boca Raton, FL (US) 33496; Timothy R Feldman, 210 Lansing Island Dr., Indian Harbour Beach, FL (US) 32937

( * ) Notice: Subject to any disclaimer, the term of this patent is extended or adjusted under 35 U.S.C. 154(b) by 0 days.

(21) Appl. No.: 09/901,240

(22) Filed: Jul. 9, 2001

(65) Prior Publication Data

US 2003/0008696 A1    Jan. 9, 2003

(51) Int. Cl.
*A63F 9/24* (2006.01)

(52) U.S. Cl. .................................................. 463/9

(58) Field of Classification Search ........ 273/236–237, 273/262, 260, 460; 463/40–44, 9, 14, 30–32
See application file for complete search history.

(56) References Cited

U.S. PATENT DOCUMENTS

| | | | | |
|---|---|---|---|---|
| 3,638,946 A | * | 2/1972 | Bain | 273/134 |
| 3,831,944 A | * | 8/1974 | Upton | 273/131 |
| 3,998,463 A | * | 12/1976 | Zumchak | 273/131 |
| 4,055,346 A | * | 10/1977 | Garcia-Kuenzli | 273/131 |
| 4,093,236 A | * | 6/1978 | Hoffa | 273/255 |
| 4,270,755 A | | 6/1981 | Willhide et al. | |
| 4,687,206 A | | 8/1987 | Cordry et al. | |
| 4,733,870 A | | 3/1988 | Rinehart | |
| 4,765,627 A | * | 8/1988 | Ross | 273/255 |
| 4,902,017 A | * | 2/1990 | Grammatico | 273/240 |
| 5,150,908 A | * | 9/1992 | Codinha | 273/262 |
| 5,609,339 A | * | 3/1997 | Mahoney | 273/255 |
| 5,964,660 A | * | 10/1999 | James et al. | 463/1 |
| 5,971,395 A | * | 10/1999 | Swift | 273/262 |
| 5,984,786 A | | 11/1999 | Ehrman | |
| 6,009,458 A | | 12/1999 | Hawkins et al. | |
| 6,209,873 B1 | * | 4/2001 | DeGeorge | 273/262 |

OTHER PUBLICATIONS

WARCRAFT II (Blizzard Entertainment) manual, 1995-1999.*
"Homeworld Historical and Technical Briefing", Sierra Studios, 1997-1999.
"Total Annihilation" manual, Cavedog Entertainment, 1997.

* cited by examiner

*Primary Examiner*—Frederick C. Nicolas

(57) ABSTRACT

Area-based resource collection comprises a system and method in which players in a real-time strategy game first define an area of influence, which, after the effects of other areas of influence have been considered, is used in calculating their resource collection potential. Embodiments of area-based resource collection include, for example, enabling a first player to define a first area within a map, the map being utilized in a playing of a real-time strategy game, the map comprising a field from which resources may be acquired, the first area overlapping at least a portion of the field, the overlapped portion of the field defining a potential resource collection area; enabling a second player to define a second area within the map, the second area overlapping at least a portion of the potential resource collection area; impacting an acquisition, by the first player, of resources from the portion of the potential resource collection area being overlapped by the second area; enabling the first player to acquire resources from a portion of the potential resource collection area not being overlapped by the second area; and enabling the player to utilize the acquired resources in the playing of the game.

20 Claims, 3 Drawing Sheets

AREA-BASED RESOURCE COLLECTION IN A REAL-TIME STRATEGY GAME

BACKGROUND OF THE INVENTION

1. Field of the Invention

The present invention relates to systems and methods of collecting resources in interactive multiplayer real-time strategy computer games.

2. Background Information and Description of the Related Art

Real-time strategy ("RTS") games generally comprise a military engagement played between two or more forces in which units and/or structures under the direction of specific players are used to achieve the complete destruction of all enemy controlled units and/or structures, and/or the attainment of game specified objectives. Often, the ability to produce more units and/or structures is available, and this usually requires the acquisition and expenditure of resources. Thus, the gathering of resources is an important element in RTS games.

Resources come in many different embodiments, including gold, wood, food, stone, oil, lumber, ore, crystal, gas, metal, energy etc. Some games simply use the resource unit, or "RU", to represent collected resources. The method by which the player must obtain these resources vary greatly from game to game, from resource to resource within a game, and also between ways to collect the same resource within a game. These resources are often required for the production of units and structures, the usage of special abilities, and/or the researching of new technology or upgrades.

Units are characterized by their mobility, where structures are characterized by their relative lack of mobility. Examples of units include: infantry, tanks, aircraft, ships, spaceships, support or transport vehicles or organized groups of the above. Structures can serve many functions, though the most common are stationary defense, production of resources, or construction of additional units or structures. Examples of structures include barracks, bunkers, factories, oil platforms, refineries, watch towers, space stations, stationary long-range cannons etc.

Some games also require that the player have a place to store obtained resources. Other games place no restrictions on storage. In some games: i) the player produces resources in finite amounts dispersed over an interval of time; ii) the player is continually producing resources, either constantly or at a variable rate; and/or iii) the player is given resources at the beginning, or at a constant rate throughout the game, regardless of the current status of game elements.

Methods of resource collection currently in practice include:

Production—A method whereby buildings can be constructed, without the local presence of resources, which then produce resources for the player. Sometimes, the resources are delivered into the player's use at a constant rate, other times the resources arrive in packets of more than one unit, dispersed over a span of time. Additionally, sometimes specialized units can perform this function.

Selling—A method whereby a player's own units or structures can be converted back into resources, made available for use by the player. Sometimes, this requires the usage of one or more specialized units or structures.

Internal Trade—A method whereby resources of one type may be exchanged for resources of another, often at a premium.

External Trade—A method whereby a player may exchange resources with another player or players.

Injections—A method whereby the player is given resources over a period of time, either in a constant rate or in packets dispersed over a span of time.

Bounty—A method whereby the player is rewarded with resources for the accomplishing of certain feats or objectives in the game, such as the destruction of an enemy unit.

The two most widely utilized methods of resource collection are mining and harvesting.

Mining—A method whereby resources are located in a specific point and are collected through the construction of structures which collect the available resources for the player. Resources may be delivered into the player's use at a constant rate or provided in packets of more than one unit dispersed over a span of time. Additionally, specialized units may perform the function of a mine.

Harvesting—A method in which resources are gathered by harvester units or buildings, then transported to a collection or refinery building to be made available for use. Harvesting is distinguished from mining by the additional step of transporting the resources to a collection location.

Reclaiming—A method whereby the destruction of units or structures can result in the dispersal of resources, thus making mining or harvesting possible anew.

The methods of resource collection described above only enable the player to collect resources through the possession or control of separate points of the map. None of the methods include area of influence as a variable in determining the resources that may be collected. Specifically, in mining, harvesting, and reclaiming, the determinants of resource collection are specific resource or units points.

SUMMARY OF THE INVENTION

Area-based resource collection methods enable a player to establish areas of influence from which resources may be collected by that player. In other words, in an RTS game implementing area-based resource collection methods a player collects resources from within influence areas that were defined by the player in the game's map.

The conceptual distinctions between area-based resource collection methods of the present invention and prior-art item-based resource collection methods offer significant advantages in the design and playability of multi-player real-time strategy games.

Accordingly, by contrast to the mining, harvesting, reclaiming, and other resource collection methods, it is an object of the invention is to enhance the playability of RTS games through the incorporation of area-based resource collection methods.

It is also an object to increase the complexity and sophistication of resource collection in RTS games through the incorporation of area-based resource collection methods.

It is also an object to enhance and deepen strategic possibilities in RTS games through the inclusion of units and structures whose design and game rules take advantage of an area-based resource collection methods.

It is also an object to establish a distinction between the potential for resource collection of an area of influence and the actual resource collection that may be realized from the area of influence.

It is also an object to create more flexibility in resource collection strategies through the utilization of areas of influence that are user-defined.

It is also an object to provide for dimensionally and qualitatively varied areas of influence.

It is also an object to provide for highly dynamic areas of influence and resource collection areas.

It is also an object to provide areas of influence that are defined in response to particular combination of units and structures.

It is also an object to provide areas of resource collection that dimensionally, qualitatively, and/or quantitatively are responsive to overlapping areas of influence that may be cooperative or conflicting.

Briefly these objects of the inventions are accomplished by area-based resource collection methodologies wherein: i) a player's area of influence may be defined directly by defining means such as the deployment of units, structures, resources within the context of a games multiplayer interactions; ii) units and structures may have a predefined area of influence associated with them; iii) the size, shape, or position of a unit's or structure's areas of influence may change based upon the size, shape or positioning of other areas of influence; and/or iv) areas of influence and resulting areas of resource collection are responsive to intersecting areas of influence under the control of either friendly or hostile units.

These and other features, advantages, and objects, are apparent in the context of the detailed description, accompanying drawings, and appended claims, that follow.

DETAILED DESCRIPTION OF THE INVENTION

Figure 1:
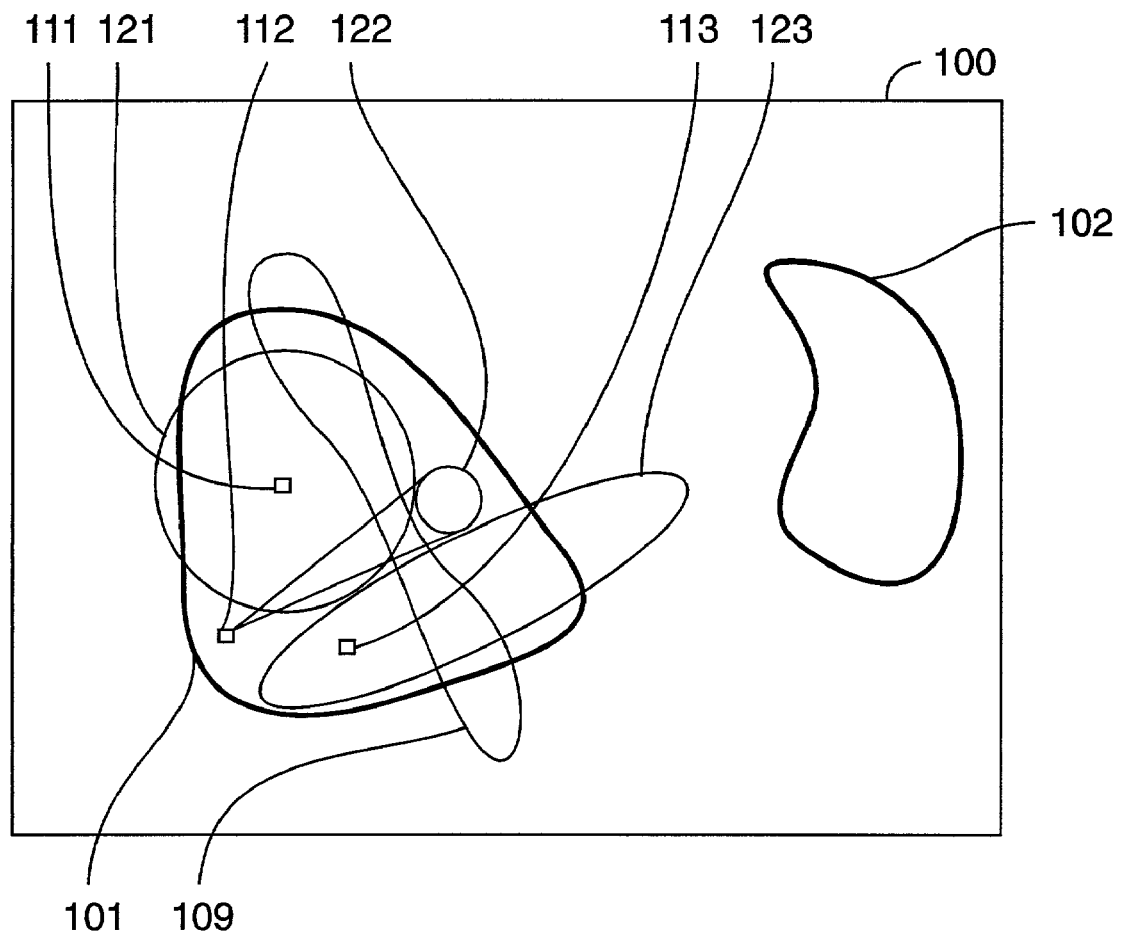
FIG. 1 is a diagram of a game in progress implementing area-based resource collection.

The term "map" is the industry standard term for the environment, level, or field in which the game takes place. Maps may include many important elements with which the players interact, such as terrain, location of resources, neutral forces, boundaries etc. Examples of maps may include dusty battlefields, medieval castles, undersea regions, space stations, island chains, asteroid belts, whole planets, entire solar systems, complete galaxies, or a kitchen counter. The map is usually created in a process separate to the playing of the game, e.g. by a map designer, but can also be generated, randomly or otherwise, immediately before the game begins.

The term "area" shall also mean a space, surface, and/or volume. An area may or may not have resources.

The term "field" shall mean an area from which resources may be collected; an area in which resources are available at a different density; and/or an area having qualitatively different resources.

The term "player" is to mean the human or computer entity who is a participant in the game.

The detailed description that follows will first explain methods, concepts, principles, rules, and examples, that may be implemented in a RTS game incorporating area-based resource collection methods. The area-based resource collection methods will be further explained in the context of one preferred embodiment. Finally, the area-based resource collection methods and advantages will be further explained by applying them as enhancements to two currently popular RTS games.

Area-based resource collection methods comprise a logically integrated set of rules, for use in RTS games, that define how area-based resources are collected and utilized to advance the realization of the games objectives. More specifically, area-based resource collection rules provide the mechanism by which players acquire resources, vital to a game's objective, through the control of areas of the map which are constantly being redefined by the players' actions.

Area-based resource collection enables a player to define an area of influence within a map from which the player may collect resources. The definitions of these areas of influence for a given player may be responsive, directly or indirectly, to that player's decisions, actions, orders, and interactions with other players. The amount of resources rewarded to a player for control of areas may be determined by the size of the area, the quality of resources in that area, technologies possessed by the players, quality and status of unit or structure which helps to define area, and/or if the player shares influence of the area with other players.

To bring an area under a player's influence, a player may, for example, either construct or deploy a unit or structure which would bring a space under the player's influence dependant on the properties of that unit or structure. For example, a specific structure may be associated with an area of influence falling within a preestablished radius from the center of the structure.

The size, shape, position, orientation or any other property of a unit's or structure's area of influence might change based upon the current size, shape, positioning, orientation or any other property of other areas of influence, whether the areas belong to friendly or hostile sides. Area-based resource collection may be responsive to a variation in the resource value of certain areas, so that control of certain areas yield more or less resources per unit of area or volume than others. Further, different areas may yield different types of resources, or combinations of resource types, or no resources at all.

Area-based resource collection methods motivate players to expand their areas of influence as much as possible, while at the same time being motivated to defend it from attack and contain their opponents' expansion. It is in the interaction between opposing areas of influence that the area-based resource collection rules add interesting and additional novels levels of game play. It also allows for the game to incorporate many special units, structures and abilities that further impact resource collection by affecting the various properties of an area of influence, including scope, quality, and ownership.

Area-based resource collection methods enable affecting resource collection by the overlapping of controlled areas. The overlapping of a player's areas of influence results in diminishing marginal returns. The overlapping a two player's controlled areas results in the sharing of either resource production in the common area, a splitting of the common area into two separately controlled zones, a cancellation of resource production in the contested zone, or simultaneous ownership by both sides. This allows for extremely varied and dynamic rules that may be applied to resource collection and production. For example, the collection potential of two structures having influence over a congruent area may be responsive to the rules of a gravity model, i.e., relative strength of the structures and inverse of the square of the distance. This example highlights a major conceptual and advantageous distinction over the conventional resource collection methods which only provide a two-state (on or off) resource collection status. Area-based resource collection rules provide for a wide-spectrum resource collection statuses.

Area based resource collection may be applied differently to the various components found in the various mining, harvesting, reclaiming, and other resource collection methods. For example, area based resource collection can be synergistically integrated with a resource networking system in manners not anticipated, facilitated, or made possible by point-based resource collection methods.

Resource networking is the system by which players are required to move, store or handle resources between the time they are produced to the time they are used. It can vary greatly from game to game. The resource networking system of the present invention provides the features necessary for a player to establish a network of transportation to move resources from collection, production, storage, and consumption. The network could be a physical in nature and exist in the game environment, for example, the pipes connecting a oil well to a refinery and finally with a storage tank. Also possible is the power grid that links power plants with transformers with power lines and finally with factories. Also possible is a more intangible network where the connectors do not physically exist in the game environment.

Because distance becomes a natural factor in an area-based system, resource networking over long distance becomes an interesting strategic problem. The network can be shut down if parts of it become destroyed or otherwise inoperative, forcing the player to quickly adjust to the problem. Certain weapons or effects could be transmitted through the network, such as computer viruses or corrosive chemicals, the effectiveness of which is dependant on properties of the network. Firewalls or security checkpoints on the network could be used to counteract such weapons. This would all lead to novel forms of player interaction. Additionally, units which act as resource leeches could be implemented such that they attach themselves to an opponents network, and drain away a portion of the resources being transmitted, possibly returning those resources to the player who controls the leech. Simply, the implementation of a resource networking system is more feasible and interesting in an area-based resource collection environment because of the distances that will naturally separate the resource collectors.

As demonstrated, area-based resource collection methods have produced unexpected results and advantages by enabling new principles of operation. In the case of a network system, area-based resource collection methods create more strategic possibilities and considerations for the players.

In a preferred RTS game embodiment, the game is set in a high-technology universe in which resources are collected primarily through the use of reactors.

By building a basic reactor, a player defines an area of influence surrounding the reactor. That is, the actual area of influence and the resulting resource collection potential are dynamically defined in response to a player's action. An area of influence is not established in advance of play.

The specific extent of this area may be influenced by the research of new technologies, construction of improvements, presence or conjunctive use of other buildings or structures, or the orientation of the reactor. For example, the player could extend the area of a given reactor by allocating resources to that reactor so that improvements may be constructed. Additionally or alternatively, the player could construct a research center in which technology to increase the rate of output for all reactors might be acquired.

Reactors are made available in several different forms, such as basic, directional, focused, and/or mobile. Basic reactors would be the most simple, having a medium sized circular area of influence centered on the reactor. Directional reactors would have areas of influence in the shape of ellipses not centered on the reactor, so that the player could reach areas not otherwise possible by orienting the reactor toward the desired area. Focused reactors might have a smaller base area but have a bonus to the rate of resources extracted or be able to project their areas of influence to alternate locations. Mobile reactors would be closer in function to units than structures and be able to relocate themselves and thus their area of influence as the player sees fit.

Of significant importance are the rules governing the interaction between reactors of opposing players. When areas of influence overlap, the intersected area is divided between the players so that new boundaries are formed. Alternatively, the resource income from the intersected area could be split as though the players shared control. Two more alternate possibilities are that control of the shared area is given to neither player, or that both could control the area simultaneously to it's full effect. Finally, and preferably, the division of the contested area would adhere to a gravity model, where the distance and strength of opposing reactors are considered in determining the extent and degree of control.

Important to gameplay are effects that would increase or decrease production in an area. The income generated by an area may be influenced by a resource index of the terrain itself, which is defined during the assembly of the map. This index could be positively influenced by the presence of natural resources, or conversely, negatively influenced in varying degrees by the usage of conventional, chemical, or nuclear weapons in that area. For example, a player could launch a nuclear missile at an opponent's area of influence, and the successful detonation of the warhead would create an area around the impact site in which resource production is suspended or reduced for a period of time before slowly returning to a fraction of its original production.

The resource index might also decrease with time, to simulate the depletion of resources. The rate of decrease could be dependant on the rate of extraction, which would counterbalance the massive upgrading of extractors to produce resources at an extreme rate.

Reactors could be upgraded to produce more resources or to expand their areas of influence. Additionally, a damaged reactor could function at a lowered rate dependant on damage.

FIG. 1 is a diagram of a game in progress implementing area-based resource collection. The diagram depicts a game map 100. For purposes of simplifying the diagram, the game map 100 is illustrated in a single plane. It is understood that in a preferred embodiment the game map 100 and the features shown and described below may be three-dimensional.

In the map 100, a player has set up three reactors; a basic reactor 111 with corresponding area of influence 121 in the shape of a circle, a focused reactor 112 with a projected area of influence 122, and a directional reactor 113 with it's area of influence 123 in the shape of an ellipse.

In this embodiment the means 111–113 for defining an area of influence and/or area of resource collection may also serve as means for acquiring resources from the area. For example, the three reactors 111–113 not only define their areas of influence but also serve to acquire resources from their respective areas.

The map includes two areas of higher resource density 101 and 102. The player has set up his reactors 111–113 to cover most of the near resource zone 101 to maximize resource production while clustering the locations of the reactors to promote defense.

Accordingly, for example, a game embodying area-based resource collection comprises the means for, and/or the steps of: enabling a player to define a first area within a map, the map being utilized in a playing of a game; enabling the player to acquire resources from the first area, an amount of resources that may be acquired being responsive to a dimensions of the area; enabling the player to define a second area within the map; and enabling the player to utilize resources acquired from the second area. A game embodying an area-based resource collection may also comprise, for example, wherein at least one of the first area and the second area is a volume; wherein the first area is dimensionally different from the second area; wherein the first area and the second area differ with respect to a degree of influence over an amount of resources that may be acquired; wherein the amount of resources that may be acquired is further responsive to a magnitude of a means for acquiring resources; wherein the amount of resources that may be acquired is further responsive to a distance to a means for acquiring resources; wherein the second area overlaps a portion of the first area, and wherein the overlapped portion has an effect on a rate at which resources may be acquired by the player from the overlapped portion; wherein the second area overlaps a portion of the first area, and wherein the overlapped portion has an effect on a total quantity of resources that may be acquired by the player from the overlapped portion; wherein the map comprises a plurality of fields having different densities of resources; and/or wherein the map comprises a field having qualitatively different resources.

Additionally, in the example shown in FIG. 1, there is an obstacle, e.g., a mountain range 109, which hinders the player's expansion. However, the player has used the projection properties of his focused reactor 112 and the elliptical properties of his directional reactor 113 to collect resources from the zone beyond the mountain range 109 even though that portion of the resource zone 101 is not directly accessible. Furthermore, by locating his valuable reactors 111–113 on the near side of the mountain range 109, he makes use of the naturally defensive features of the terrain.

The delineation of higher resource density zones, and the possibility that zones outside of the two resource patches 101 and 102 do not produce resources at all, as well as the mountain range 109, are not required to obtain the benefits of an area-based resource collection implementation.

Further, while this particular embodiment includes zones identifying resources, the actual areas of influence 121–123 from which resources may be collected by the player were defined by the player's placement of the resource collecting structures 111–113.

The definition of zones 101–102 may also result from the actions of players, e.g., prior depletion of resources, exploration, counter-intelligence. Thus, with a few elements and few rules, the playing map can be highly dynamic and complex providing many variations for game playing.

Figure 2:
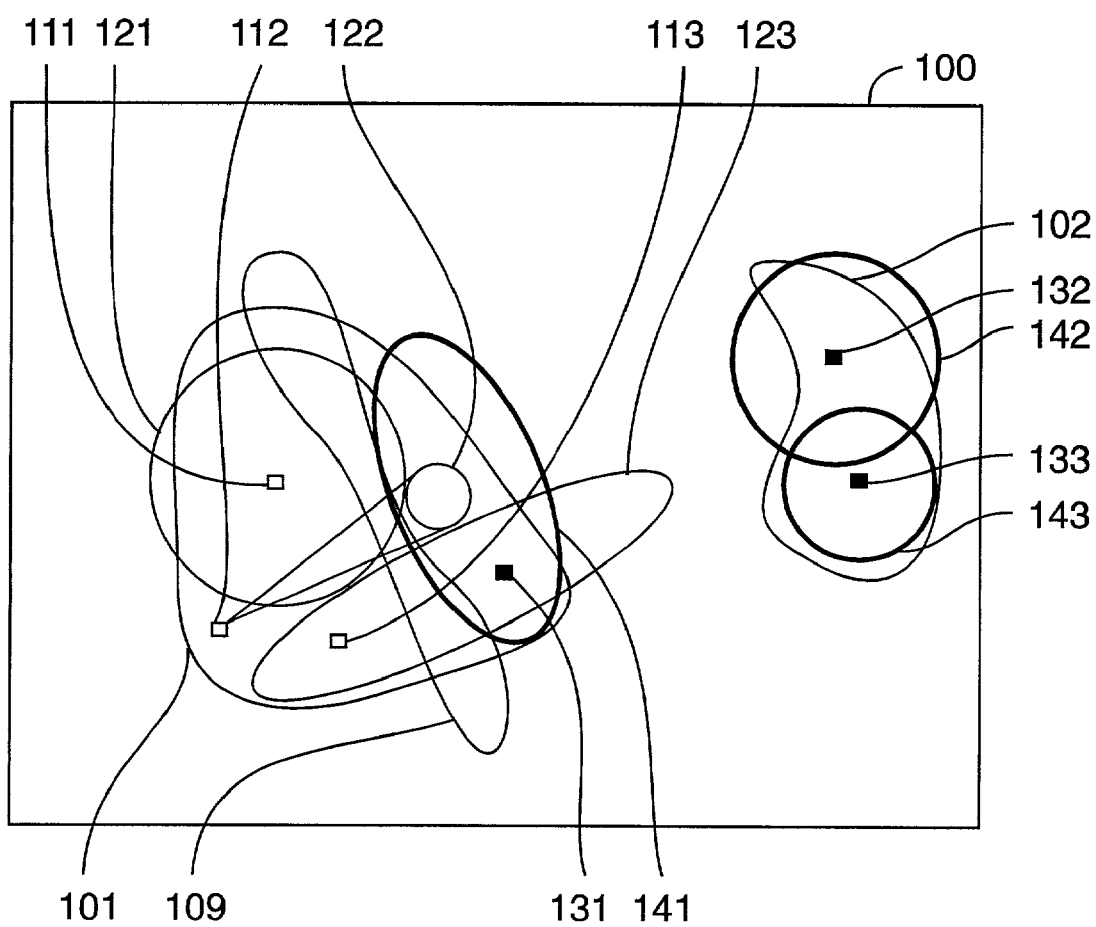
FIG. 2 is a diagram of a game in progress implementing area-based resource collection illustrating the impact of the actions of a second player.

FIG. 2 is a diagram of a game in progress implementing area-based resource collection illustrating the impact of the actions of a second player. The two players will be refereed to as "the light player" whose reactors 111–113 were previously discussed with respect to FIG. 1 and are similarly shown in FIG. 2; and "the dark player" who constructed a reactor 131, defining an area of influence 141 in resource patch 101, and two basic reactors 132 and 133 in the neighboring resource patch 102. These two reactors generate an overlapping areas of influence 142 and 143 for the dark player.

The map includes two areas of higher resource density 101 and 102. The light player has set up his reactors 111–113 to cover most of the near resource zone 101 to maximize resource production while clustering the locations of the reactors to promote defense. The dark player, with the placement of his reactors 131–133, has taken advantage of the far resource field 102 and has influenced some of the near resource field 101.

There are several sets of possible rules that govern what happens when areas of influence overlap. For example: i) a gravity model could be used, where the intersecting area is divided between the two reactors based on the relative strength of each reactor and the distance to each point in the intersecting area; ii) the resources normally produced from the intersection could be shared by the two reactors, equally or otherwise; iii) the intersection could suffer from interference from both reactors, and yield no resources at all; iv) the intersection could produce resources normally for each reactor, as though it were not a shared area at all; and/or v) synergies would result in the production of resources exceeding the sum of the individual production rates. If the resources are exhaustible, which need not be the case, some of the rules would cause the depletion of the underlying resources at a faster rate.

As is illustrated, in this scenario the dark player has constructed a directional reactor 131 which uses it's area of influence 141 to intersect all three of the light player's reactor's 111, 112, 113 areas of influence 121, 122, 123.

The intersection between areas 141 and 121 can be handled in the same ways as the intersection between areas 142 and 143.

The intersection between 141 and 123 could also be handled in the same ways as the intersection between areas 142 and 143, however, there are several more possibilities. Because the reactor 131 for area 141 is actually located in the intersection, in a gravity based model reactor 131 would claim most of the intersection, and only possibly lose some of the left-most region to reactor 113. It is a possibility that the area to the right of the intersection belonging to area 123 might be cut off and not yield resources at all. In this way, the dynamic and volatile nature of light player's potential resource collection area is demonstrated.

Furthermore, the intersection between areas 122 and 141 can be handled in the same way as the intersection between areas 142 and 143. However, it is also a possibility that the region on the far side of area 122 from reactor 131 might not yield resources, as it has been cut off by the intersecting area. Furthermore, for the purposes of calculating distance in a gravity based model the center of reactor 112, and all other focused reactors, might be considered to be in the center of their respective areas of influence, in this case area 122.

FIG. 2 makes the distinction between areas of influence and the actual areas from which resources may be acquired. For each reactor placed, it is the case that the potential resources in a reactor's area of influence is greater than the actual resources it produces. It should be noted, however, that this need not be the case.

Furthermore, in the particular cases of reactors 131, 113, and 112, it is demonstrated that the value of placing a reactor may be greater for the area of influence that it generates rather than for the actual resources it produces. In this fashion, the area-based resource collection methodology is advantageously distinguished from the prior art.

Thus, for example, a game embodying area-based resource collection comprises the means for, and/or the steps of: enabling a first player to define a first area within a map, the map being utilized in a playing of a game, the map comprising a field from which resources may be acquired, the first area overlapping at least a portion of the field, the overlapped portion of the field defining a potential resource collection area; enabling a second player to define a second area within the map, the second area overlapping at least a portion of the potential resource collection area; impacting an acquisition, by the first player, of resources from the portion of the potential resource collection area being overlapped by the second area; enabling the first player to acquire resources from a portion of the potential resource collection area not being overlapped by the second area; and enabling the first player to utilize the acquired resources in the playing of the game. A game embodying an area-based resource collection may also comprise, for example, wherein the impacting of an acquisition of resources reduces a rate that resources may be acquired, by the first player, from the portion of the potential resource collection area being overlapped by the second area; wherein the impacting of an acquisition of resources prevents the first player from acquiring resources from the portion of the potential resource collection area being overlapped by the second area; wherein the impacting of an acquisition of resources is responsive to a comparison of a means utilized by the first player to define the first area to a means utilized by the second player to define the second area; and/or wherein the impacting of an acquisition of resources is responsive to a comparison of a capability of the first player to acquire resources from the first area to a capability of the second player to acquire resources from the second area.

Figure 3:
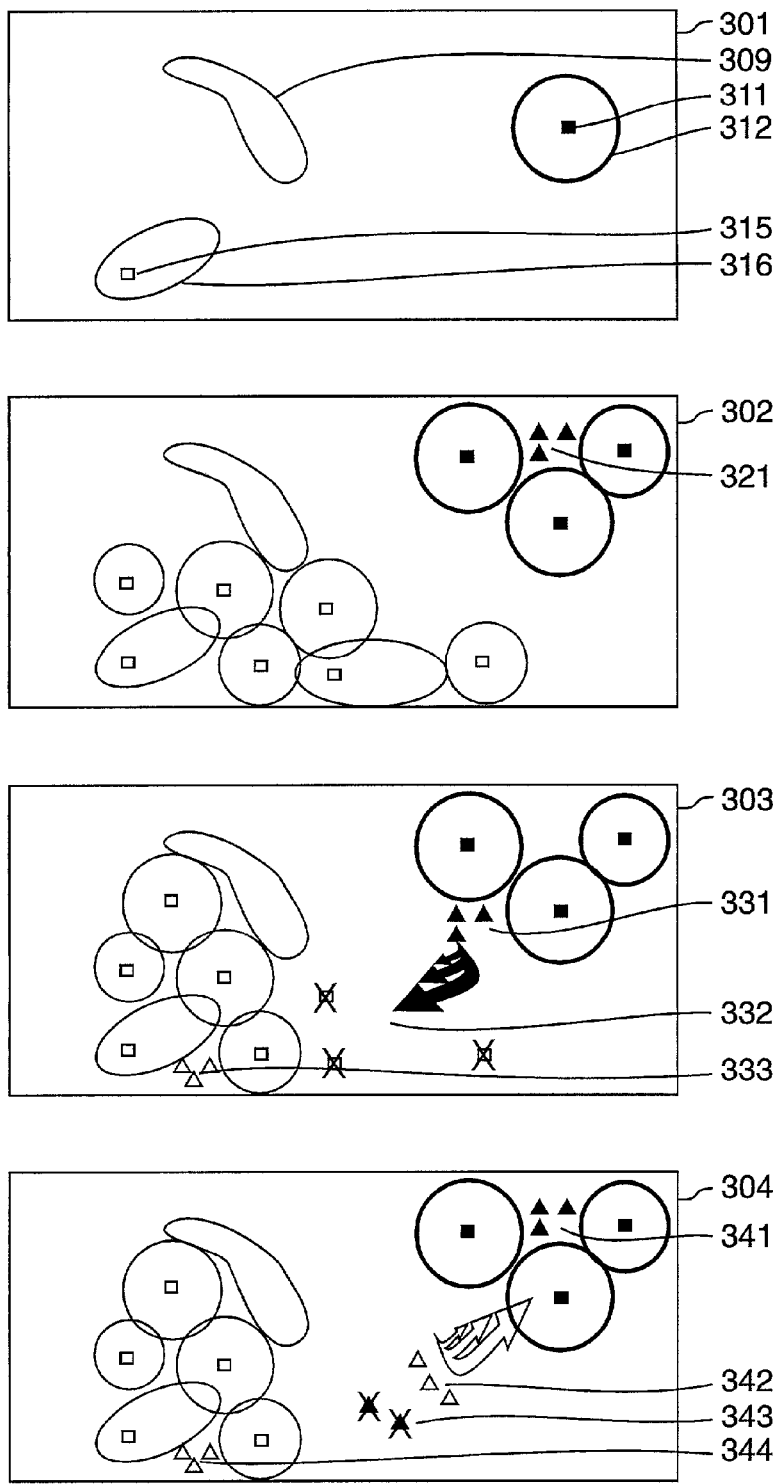
FIG. 3 is a diagram of four stages of an RTS game in progress implementing area-based resource collection.

FIG. 3 is a diagram of an RTS game in progress implementing area-based resource collection. The diagram depicts four stages of the game played, descending in chronological order. In the first stage 301, the game has just started, with the light player situated in the lower left with his first reactor 315 and its corresponding area of influence 316. The dark player is in the upper right with his reactor 311 and its corresponding area of influence 312. Also shown is a feature of the natural terrain, an impassible mountain range 309.

Using the resources produced from their initial setups, the two players have expanded their areas of influence by constructing more reactors, as shown in stage two 302. The light player has reinvested almost all of his resources produced in expanding his total resource income and has spent little on defense; his area of influence is large. The dark player, however, has used many of the resources collected to build a small force of combat units 321.

In stage three 303 the dark player has used his forces 331 to attack the light player's territory. Realizing that the light player was far ahead in terms of resource potential, the dark player attempts to slow the light player's growth. Easily overcoming the light player's defenses, the dark player has advanced to destroy three of the light player's reactors 332. At the same time, however, the light player has utilized the resources acquired earlier to research new weapons technology which allows him to construct more powerful units. Reacting to the dark player's attack, the light player constructs a force of powerful fighting units 333.

In stage four 304 the dark player attempts to destroy more of the light's player's reactors, but his units are halted and destroyed 343 by light player's units 342. During the battle, both the light player and dark player continue to produce more resources and continue to manufacture new units 344 and 341. The light player decides to press his advantage and sends his forces 342 at the dark player's area of influence, hoping to inflict as much damage as possible. At this point, the light player is in a good position because of the control of more territory and is forcing the dark player on the defensive.

Many RTS games that already exist can be improved by modifying or replacing their current resource collection system as per the area-based resource collection teachings herein. To this end, the games "Total Annihilation" by Cavedog, and "Homeworld" by Relic Entertainment, will be reviewed to further point out the features and advantages of the present invention.

Total Annihilation ("TA") is a sci-fi RTS game set in the far future. The premise is that two futuristic armies clash on land, sea, in the air, and even underwater. The map is essentially two dimensional, though height does come into play at times.

In TA, each player begins with only one unit, the commander. This is the central unit of each player's army, as it represents that player on the battlefield. It has the capacity to construct many basic level buildings, which will serve as the base for that player's army.

There are two resources in TA, energy and metal. Resource collecting comes in many forms, but the most basic fall under the categories of production and mining. Usually the first action of any player is to build a solar plant. Using the commander, the player will construct the plant, consuming metal and energy in the process. The resulting solar plant will produce a set amount of energy at a constant rate from that point on, so long as it is not attacked or destroyed. The next action is usually to build a metal extractor. This requires that the player locate a patch of metal, because a metal extractor needs to be built on top of one. Once construction is complete, it will produce metal at a constant rate dependant on the quality of the metal patch. Only one extractor may be constructed per patch.

The player may then move on to build a factory, and the possibilities are great from this point on. There are several ways to acquire resources from this point on, and I will summarize them all here.

There are several structures that a player can build to produce resources, and they include:

Solar plants, which can be build anywhere and are not dependant on anything. They produce energy. Metal extractors, moho metal extractors (larger versions), and underwater metal extractors will produce metal but require the presence of a patch of metal for construction. Only one per patch. Wind power plants function like solar, but their energy output varies with the strength of the wind. Tidal generators function like wind power, but their energy output varies with the strength of the tides. Fusion plants, cloakable fusion plants and underwater fusion plants function just like solar, but require a vast investment of resources and time but yield an awesome amount of energy. Metal makers, moho metal makers, and floating metal makers consume energy to produce metal without the presence of a metal patch.

Aside from structures, resources can also be acquired by scavenging items that occur on the map. Construction units, like the commander, can, for example, salvage rocks to produce metal, and trees to produce energy. Similarly, destroyed units sometimes leave their burned, twisted shells on the battlefield, which can be salvaged for metal. Lastly, players can share resources with each another. For a more detailed explanation, the reader is referred to the "Total Annihilation" manual published by Cavedog Entertainment.

According to the area-based resource methods, TA could be enhanced, for example, as follows. Substitute the existing structures which produce energy by power field generators (PFG). A PFG structure, when produced, would generate an area of influence about itself in a given radius. If no other PFGs are attempting to influence this area, then the PFG produces energy based on the total area under it's influence. If the areas controlled by PFGs overlap, then their energy production is reduced responsive to formulas analogous to that of a gravity model.

While the foregoing is a first level enhancement, TA could be further enhanced by a few more additions facilitated by the area-based resource collection methods. The player could spend some resources to upgrade a PFG, which would increase it's radius. An upgrade could also be available to make a PFG produce more energy per unit of area. Yet another upgrade could make the upgraded PFG capable preventing other PFGs from sharing in it's production, provided that they were not likewise upgraded, so that the upgraded one would receive the full output of it's area of influence. Special units or weapons could disrupt power output in a radius around themselves. For example, a nuclear missile detonation would prevent any energy from being harvested in a radius around the blast. Trees often dot the landscape in TA, and perhaps their presence would increase energy output. This would create interesting tactics as trees (and even whole forests) are often destroyed when a stray missile sets them on fire.

Further, there could be a version of a PFG which, instead of controlling an area within a radius, would influence an ellipse around itself for which it is one of the foci. When construction is ordered, the player must specify an orientation, and the ellipse will point in this direction. This allows for advanced strategies concerning PFG deployment, especially where difficult terrain is concerned.

Some of those advanced strategies include:

The use of the specialized PFGs to be deployed in areas of wasted space, such as if there was a small area of unused space between two regular sized PFGs. The gap between them could be filled by the smaller, less expensive PFG.

The deployment of a PFG pointing towards a specific resource. For example, if forests were more valuable to influence than non-forests, and there was a forest area to the North of a location but not to the South, East or West, the PFG could be deployed in that location facing North, so as to harvest the forest only. Similarly, this strategy could be used to harvest resources from a territory without having to actually occupy that territory. So the forest in the previous example need not actually be defended, only the PFG which controls it.

These smaller, more specialized versions of PFGs would be made useful by having them cost less resource units to build, or perhaps by having an added resource bonus given to areas of the map in the radius of that PFG. This allows for even more options and decisions to be made by a player, namely, the decision to use a regular PFG to control land, or use a specialized, or more focused, PFG to save resources or collect a bonus.

There could also be units which act as mobile PFGs, having a smaller radius but being able to produce energy in hard to reach places.

An important advantage of implementing the area-based system in TA is that each player can create a resource development strategy that is unique; there is a lot of strategic variance in how the generators are set up. Since the areas of influence for individual PFGs are either circles or ellipses, they will not stack nicely together, and thus players must fine-tune between expansion and consolidation; placing generators near each other leads to over-lapping areas of influence and a loss of total capacity, though they grant redundancy in case one generator should be destroyed and are easier to defend due to their proximity. On the other hand, fervent expansionism leads to greater income and thus more defensive capability, though a larger area must be defended. Additionally, if the methods of resource networking are implemented as well, it would further enhance the strategy by requiring expansionistic players to create and defend far-flung networks of resource transportation and/or storage.

Area-based resource collection rules may be synergistically combined with other enhancements which at first may seem independent. For example, after a PFG is constructed, a count-down timer begins for that PFG, at zero the PFG may be upgraded at a minimal cost (technology advancements). This upgrade would increase the production rate of resources for that particular PFG. At this point, another count-down timer could then begin, repeating the process. This system would have the gameplay effect of mitigating decreasing marginal resources returns, if any, of an area of influence with time. It would also reward players for long-term occupation of a territory.

Similarly, the previous system could be mimicked if instead of count-down timers and levels of enhancement, there was a production index, specific to each PFG, that would act as a multiplier to the rate of resources that are extracted from an area of influence by that PFG. The rate or resource collection would increase at a constant rate for each PFG once constructed.

Homeworld is a sci-fi RTS game that occurs in space. The basic premise is two or more fleets of ships, each having a mothership as it's center of operations, fight over a region of space. The weapons at each player's disposal include fighters, bombers, corvettes, frigates, destroyers, among others. The game is also unique in that it is fully three-dimensional. Movement and combat occur in three dimensions.

In Homeworld, raw resources come in two embodiments, asteroids and dust clouds. Collected resources are simply called resource units, or RUs. Resource collection occurs using two types of units. Resource collectors are the mobile gatherers of resources. They go out into the field and find asteroids or clouds of space dust and are able to convert these raw materials to resources which are stored in the collector. When the storage capacity of the collector is used up, it returns to either a resource controller, mothership, or carrier, and deposits the resources. These ships can be considered drop off points. Once the resources have been dropped off, they are immediately converted into units that can by used by the player to construct units anywhere. So resources harvested in one place can be dropped off to a local controller, and then used to build a unit on the other side of the map, regardless of distance or what might exist in-between. While the mothership and carrier can act as drop off points, controllers are the most efficient units to use for this purpose. Once a collector has dropped off it's load, it immediately returns to gathering more resources.

There is essentially no limit to the number of collectors that can be harvesting from the same raw material at the same time. For example, a particularly large asteroid can be accessed by many collectors at once, regardless of who controls those collectors. There is no limit to the number of resources that a player can store at a given time.

There are two other secondary methods of obtaining resource units in Homeworld. One of these is bounty, in which the destruction of an enemy ship yields resource units to the destroyer. The amount of bounty received is determined by three factors. First the bounty setting that was chosen before the beginning of the game, low, medium or high. Second the cost of the ship destroyed. Third the bounty rating of the player whose ship was destroyed, which is determined by the total size of their fleet. This third factor is important because it makes powerful players more attractive targets because their ships yield a larger bounty. Resource units acquired from bounty are immediately deposited in a player's pool, so there is no transportation required.

The other method of acquiring resources in Homeworld is injections. The first type of injections is that all players are given a certain amount of resources periodically. For example, the game could be set to give each player 2,000 resource units every 5 minutes. The second type is lump sum injections, which can be set to give a certain amount of resources at one specific time in the game. For example, lump sum could be set to 50,000 resource units at 30 minutes, and each player would receive 50,000 resources after 30 minutes have passed. Periodic and lump sum injections can operate independently or together in a game.

Lastly, there is one final setting in Homeworld that effects resources, which is the starting resources of a player.

The three methods of acquiring resources can all be enabled or disabled independently of each other, though bounty alone would not make for a very interesting game because there would be very little resources available for the players to work with.

For a more detailed explanation, the reader is referred to the "Homeworld Historical and Technical Briefing" manual published by Sierra Studios.

According to the area-based resource methods, Homeworld could be enhanced, for example, as follows. Instead of small pockets of resources as is often found on current Homeworld maps, a vast field of asteroids, encompassing the entire map, would be incorporated to serve as the raw material or resources in the game. Resource collectors would be replaced with construction units, which would construct collection bases inside the field, perhaps converting a particularly large asteroid into a collection base. This base would exert an influence in a certain sphere around itself, gathering resources and producing an output for the player. Perhaps it would use autonomous drones to either harvest resources or tow back asteroids for processing. The graphical depiction of these drones at work might be only reflective of the extent of influence, or the progress of the drones might actually simulate the extent of influence and determine the amount of resources produced. Each central base could also build smaller sub-bases which would add to the output. Thus, the existence of this base would bring a sphere of the asteroid field under a player's control. The base could be upgraded over time to extend this field, or increase the output rate; thus a base expands itself as time goes on. Overlapping fields could occur often, in which case the worker drones might conflict with each other and result in reduced output for both sides.

Another feature of this system could be a setting for the resource base that would determine how much of the produced resources are used to build more worker drones and enhance base facilities, which would increase radius and output. Thus, as resources are collected, a variable amount of them could be used in further increase the rate at which resources are gathered. Raids could be conducted to destroy worker drones or sub-bases and reduce the output of an enemy's area of influence. To counteract this, perhaps some of the resources gathered would also be automatically used to construct defenses around the area in which the base exerts influence. The player could be given control over this through a three-way slider control, which sets the percentage of income for a given collection base dedicated to the production of new collection drones, static defenses in that territory, and actually making resources available to the player.

Transportation and networking could be added to this system, so that refined resources must be transported from the base back to the place of construction, such as a mothership or carrier. Perhaps this twist on Homeworld would get rid of the mothership as the center of operations, and allow the construction of factories and research facilities on other asteroids within established spheres of influence.

The advantage of such a design over the existing one is that the game would further develop it's 3-dimensional nature. It would gain a new aspect of territoriality that it currently does not possess. Every volume of the map now has resource value, and is thus an objective to be controlled, attacked, and defended. Attackers have many different vectors of attack to choose from, and defenders have more challenging problems of defense. This is far more interesting, strategically, than what the existing system usually boils down to: two important points of control for each side: the mothership and the nearest asteroid field, which limits the strategic possibilities. The problem is even worse when, as most players do, the mothership is moved to be adjacent to the asteroid field, making the two objectives the same one, and giving an attacker only one option.

Homeworld suffers from the problem of predictability and repetitiveness in gameplay. Introducing an area-based resource collection system would solve this problem by allowing more freedom in resource collection strategy, and creating more freedom in offensive strategy. It would also work synergistically with the game's existing three-dimensional nature that has not yet been properly utilized.

Furthermore, any system that incorporates an area-based resource collection system could be easily further enhanced by allowing other gameplay features to utilize the already implemented area-based rules. For example, in the game described above using reactors to define areas of influence for resource collection, those same areas could be used for other purposes as well. For example, a common problem in RTS games is that once an attacker has broken a defender's defense, the game is all but over, and there is little chance of recovery. An area based system would suffer less from such a problem because of the spread out nature of a player's controlled area; a player is not likely to become completely crippled from the loss of one section of it. However, the problem of an attacker rampaging through controlled territory unopposed after the initial conflict still presents itself. Since areas of influence are already defined for resource collection, they could perhaps serve a double purpose by granting a static regenerative bonus to friendly units within their radius. A negative modifier could also apply to a player's units in enemy territory. This would make retreating and regrouping more viable strategies for the defense, and protracted offensive campaigns less viable strategies for an attacker. Additionally, since reactors are going to be spread out, they could either come with some stationary defenses attached, or could be upgraded to include static defenses at a low cost. This would not completely unbalance the game in favor of the defense, but would help to stop an attacker from pressing a marginal victory in one area of the defender's control to a decisive victory across the map. In this way, the area-based resource collections enhancements that may be implemented as per the teachings herein, have benefits beyond those directly associated with resource collection.

Area-based resource collection facilitates the use of other rules governing structures and the areas of influence. For example, when a reactor is destroyed, it could leave the area which it controlled unusable for resource production, or at least decrease that territory's natural output rate. This would make the strategy of raiding an opponents territory to destroy a reactor quite viable, and would make defending those reactors even more important. The idea of raiding is common is RTS games, but often is not feasible because of the defensibility or unavailability of targets. The system described would make raiding interesting.

Further, area-based resource collection introduces new perspectives and game design requirements. For example, so that a player understands who controls what territories, a resource overlay might be implemented in the game interface. By issuing a command, the game map might be color overlaid or coded so that it displays the areas of influence by each player. Additionally, it might be necessary to construct and power a structure which would identify the extent of controlled areas for the player, so that without such a structure the player does not appreciate an opponent's areas of influence.

In summary, the invention is a novel methodology and system of resource collection for implementation in real-time strategy games Area-based resource collection comprises a set of means and steps in which players first define an area of influence, which is then used in calculating their resource collection potential, after the effects of other areas of influence have been considered. The possible interactions between areas of influence and resource collection areas offer a range of additional game play enhancements.

While elements of the inventions have been detailed in conjunction with specific embodiments thereof, it is evident that many alternatives, modifications and variations are possible and will be apparent to those skilled in the art in light of the disclosure.

For example, while in one embodiment a distinction between an area of influence and a resource collection area may be advantageous, in a second simpler embodiment no such distinction need be made. The teachings herein with respect to, for example, an area of influence may be embodied in the area of resource collection.

Further, while the invention has been principally described as a method, the invention is not limited thereby. For example, the teachings of the inventions can be advantageously and similarly synergistically embodied in board games, apparatus capable of playing games, game systems, and networked systems.

Further, while the invention has been principally described in terms of a real-time strategy game, the invention is not limited thereby. For example, the teachings of the inventions can be advantageously and similarly synergistically embodied in board games, different electronic devices, and game systems electronic or otherwise.

The following U.S. patents, and the U.S. Patent Documents cited therein, are by reference incorporated herein in their entirety: U.S. Pat. No. 4,270,755, titled "Strategy Based Electronic Combat Game", issued to Wilihide et al., on Jun. 2, 1981; U.S. Pat. No. 4,687,206, titled "Global Domination Board Game", issued to Cordry et al., on Aug. 18, 1987; U.S. Pat. No. 4,733,870, titled "Strategy Game Emphasizing Economical and Political Development", issued to Rinehart, on Mar. 29, 1988; U.S. Pat. No. 5,964,660, titled "Network Multiplayer Game", issued to James et al., on Oct. 12, 1999; U.S. Pat. No. 5,984,786, titled "Run-Time Environment For Simulations And Games", issued to Ehrman, on Nov. 16, 1999; and U.S. Pat. No. 6,009,458, titled "Networked Computer Game System With Persistent Playing Objects", issued to Hawkins et al., on Dec. 28, 1999.

Accordingly, it is intended to embrace all such embodiments, alternatives, modifications, variations, and combinations as fall within the spirit and broad scope of the inventions.

The teachings that have been cited and incorporated herein are offered by way of example, and not limitation, of the underlying foundation of knowledge and skill that is available to a practitioner. Since the art is well established, many of the features, components, and methods found therein may be incorporated, as suggested herein, in a preferred embodiment; and since other modifications and changes varied to fit particular requirements and environments will be apparent to those skilled in the art, the inventions are not limited to the embodiments set forth or shown herein. It is to be understood that the inventions are not limited thereby. It is also to be understood that the specific details shown are merely illustrative, and that the inventions may be carried out in other ways without departing from the broad spirit and scope of the specification.

What is claimed is:

1. A method of playing a game, the method comprising the steps of:
generating, in direct response to an action of a player playing a game, a first area overlapping only a portion of a resource area, the overlapping portion defining a resource collection area; and
enabling an acquisition of resources from the resource collection area.

2. The method of claim 1, wherein the first area is a volume.

3. The method of claim 1, further comprising the step of generating a second area overlapping at least a portion of the resource collection area.

4. The method of claim 1, further comprising the step of generating a second area overlapping at least a portion of the resource collection area; and wherein the first area and the second area differ with respect to a degree of influence over the resources that are available from the overlapping portion of the resource collection area.

5. The method of claim 1, wherein the resources that are available is further responsive to a means for the acquisition of resources.

6. The method of claim 1, wherein the resources that are available is further responsive to a distance to a means for the acquisition of resources.

7. The method of claim 1, wherein the resources that are available is further responsive to a distance to, and a magnitude of, a means for the acquisition of resources.

8. The method of claim 1, further comprising the step of generating a second area overlapping at least a portion of the resource collection area; the overlapping portion having an effect on a rate at which resources are acquired from the overlapping portion of the resource collection area.

9. The method of claim 1, further comprising the step of generating a second area overlapping at least a portion of the resource collection area and having an effect on a total quantity of resources that acquired from the overlapping portion of the resource collection area.

10. The method of claim 1, wherein the first area covers at least a portion of one of a plurality of resource areas having different densities of resources.

11. The method of claim 1, wherein the first area covers at least a portion of one of a plurality of resource areas having qualitatively different resources.

12. A method of playing a game, the method comprising the steps of:

generating, in direct response to an action of a player playing a game, a first area comprising resources that are available;

generating a second area overlapping at least a first portion of the first area;

impacting an acquisition of resources from the first portion of the first area being overlapped by the second area; and enabling an acquisition of resources from a second portion of the first area not being overlapped by the second area.

13. The method of claim 12, wherein the impacting of an acquisition of resources reduces a rate that resources are acquired from the first portion of the first area being overlapped by the second area.

14. The method of claim 12, wherein the impacting of an acquisition of resources prevents the acquisition of resources from the first portion of the first area being overlapped by the second area.

15. The method of claim 12, wherein the impacting of an acquisition of resources is responsive to a comparison of a means utilized to generate the first area to a means utilized to generate the second area.

16. The method of claim 12, wherein the impacting of an acquisition of resources is responsive to a comparison of a capability to acquire resources from the first area to a capability to acquire resources from the second area.

17. A method of playing a game, the method comprising the steps of:

generating, in direct response to an action of a player playing a game, a first area overlapping at least a portion of one of a plurality of resource areas, the overlapping portion defining a resource collection area;

generating a second area overlapping at least a first portion of the resource collection area;

impacting an acquisition of resources from the first portion of the resource collection area being overlapped by the second area; and enabling an acquisition of resources from a second portion of the resource collection area not being overlapped by the second area.

18. The method of claim 17, wherein the impacting of an acquisition of resources reduces a rate that resources are acquired from the portion of the resource collection area being overlapped by the second area.

19. The method of claim 17, wherein the impacting of an acquisition of resources prevents the acquisition of resources from the first portion of the resource collection area being overlapped by the second area.

20. The method of claim 17, wherein the impacting of an acquisition of resources is responsive to a comparison of a capability to acquire resources from the first area to a capability to acquire resources from the second area.

* * * * *